(12) United States Patent
Kim

(10) Patent No.: US 8,028,813 B2
(45) Date of Patent: Oct. 4, 2011

(54) SHOCK ABSORBER

(75) Inventor: Nam Ho Kim, Bucheon-si (KR)

(73) Assignee: Mando Corporation, Gyeonggi-Do, Pyeongtaek-Si (KR)

( * ) Notice: Subject to any disclaimer, the term of this patent is extended or adjusted under 35 U.S.C. 154(b) by 368 days.

(21) Appl. No.: 12/328,473

(22) Filed: Dec. 4, 2008

(65) Prior Publication Data

US 2009/0145709 A1 Jun. 11, 2009

(30) Foreign Application Priority Data

Dec. 5, 2007 (KR) .......................... 10-2007-125533

(51) Int. Cl.
*F16F 9/36* (2006.01)
(52) U.S. Cl. .................. 188/322.22; 188/287; 188/289
(58) Field of Classification Search .................. 188/286, 188/288, 300, 322.15, 289, 322.22; 267/64.12
See application file for complete search history.

(56) References Cited

U.S. PATENT DOCUMENTS

| 5,702,091 A | * | 12/1997 | Perrin et al. ............... 267/64.12 |
| 5,884,734 A | * | 3/1999 | Hiramoto et al. ........ 188/322.18 |
| 5,887,857 A | * | 3/1999 | Perrin ........................ 267/64.12 |
| 5,971,117 A | * | 10/1999 | Grundei et al. ............... 188/288 |
| 7,428,953 B2 | * | 9/2008 | Kneip et al. ............. 188/322.15 |

FOREIGN PATENT DOCUMENTS

| KR | 20050118405 A | 12/2005 |
| KR | 20070078147 A | 7/2007 |

* cited by examiner

*Primary Examiner* — Christopher Schwartz
(74) *Attorney, Agent, or Firm* — McDermott Will & Emery LLP

(57) ABSTRACT

Disclosed herein is a shock absorber for damping vibration transmitted to a vehicle according to a road state. The shock absorber includes a cylinder and a piston valve disposed within the cylinder and connected to a piston rod to divide the cylinder into a first chamber and a second chamber. The shock absorber further includes a hollow chamber formed within the piston rod, a floating piston disposed within the hollow chamber to move up and down and to divide the hollow chamber into upper and lower chambers, first and second orifices formed in upper and lower ends of the hollow chamber and connected to the first and second chambers, respectively, and a resistance changing mechanism configured to cooperate with the floating piston and change a fluid resistance with respect to the floating piston where the resistance changing mechanism cooperates therewith.

7 Claims, 12 Drawing Sheets

SHOCK ABSORBER

BACKGROUND

1. Technical Field

The present disclosure is generally related to shock absorbers, and more particularly, to a shock absorber for damping vibration transmitted to a vehicle according to a road state and capable of changing a damping force according to a displacement of a piston rod.

2. Description of the Related Art

Generally, a vehicle is provided with a suspension system for enhancing driving comfort by buffering impact or vibration transmitted to an axle from a road during driving. One component constituting the suspension system is a shock absorber. The shock absorber is disposed between the axle and a vehicle body. The shock absorber includes a cylinder and a piston rod reciprocating within the cylinder. The cylinder is filled with an operating fluid, such as gas or oil, such that the operating fluid is moved by a piston valve secured to one end of the piston rod to generate a damping force.

A conventional shock absorber has a restriction in that it exhibits constant damping force characteristics with respect to variation of a road state or a driving posture of the vehicle. Therefore, a low damping force characteristic can improve driving comfort but does not ensure stability of the vehicle, whereas a high damping force characteristic can maintain the stable posture of the vehicle but entails deterioration of driving comfort. As such, the conventional shock absorber is incapable of controlling damping force characteristics in response to variation of the road state or the posture of the vehicle.

Accordingly, in order to solve the problem of such a conventional shock absorber, a shock absorber capable of providing variable damping force characteristics according to a displacement of the piston rod has been developed.

FIG. 1 is a cross-sectional view of a portion of a conventional shock absorber.

Referring to FIG. 1, the shock absorber 10 includes a piston rod 14 connected to a vehicle body, and a cylinder 12 secured to an axle connected to wheels. The piston rod 14 reciprocates within the cylinder 12.

The piston rod 14 includes a piston valve 16 disposed at a lower end of the piston rod 14 to divide the interior of the cylinder 12 into a tensile chamber RC and a compression chamber CC. The piston valve 16 is formed with tensile orifices 16a and compression orifices 16b through which the tensile chamber RC and the compression chamber CC communicate with each other. The shock absorber 10 further includes disc valves 18a and 18b disposed on upper and lower sides of the tensile orifices 16a and the compression orifices 16b to elastically deform and generate a damping force according to movement of the operating fluid.

The piston rod 14 has a hollow chamber 20 formed therein. The hollow chamber 20 is provided with a floating piston 22 that can move up and down and divides the hollow chamber 20 into an upper chamber 20a and a lower chamber 20b. The hollow chamber 20 has a first orifice that is defined by a through-hole 24 through which an upper portion of the upper chamber 20a communicates with the tensile chamber RC, and a second orifice that is defined by a shaft hole 26 through which a lower portion of the lower chamber 20b communicates with the compression chamber CC.

As the piston rod 14 is slightly displaced, the floating piston 22 is raised or lowered, and the operating fluid flows into or from the first or second orifice through the through-hole 24 or the shaft hole 26. As a result, the damping force of the shock absorber 10 is lowered.

The conventional shock absorber 10 can reduce the damping force only at a low displacement and low speed. Further, the hollow chamber 20 has a restricted size so that a range of motion of the floating piston 22 is limited, thereby providing a low effect in reduction of the damping force. In this regard, when increasing the size of the hollow chamber 20 to improve the effect of reducing the damping force, there are problems of a manufacturing cost increase and a durability deterioration of the piston rod 14.

Furthermore, the conventional shock absorber 10 is likely to suffer impact and noise resulting from collision between the floating piston and the upper or lower end of the hollow chamber when the floating piston is raised or lowered within the hollow chamber of the piston rod.

BRIEF SUMMARY

Embodiments of the present disclosure provide a shock absorber to solve the aforementioned problems of the conventional shock absorber by changing motional characteristics of the flowing piston at an intended location within the hollow chamber.

According to an aspect, a shock absorber is provided that can change a fluid resistance with respect to a floating piston at any intended location within a hollow chamber to improve motional characteristics of the floating piston at that location.

Another aspect of the invention is to provide a shock absorber that includes a resistance changing mechanism configured to prevent the floating piston, disposed in the hollow chamber of a piston rod to lower a damping force, from completely closing an upper chamber and a lower chamber of the hollow chamber, so that the shock absorber can noticeably reduce the damping force in a region where the piston rod repetitiously moves, can gradually reduce the damping force according to a displacement of the piston rod to improve driving comfort and stability of the vehicle, and has a superior degree of freedom in tuning for lowering the damping force.

A further aspect of the invention is to provide a shock absorber that includes a mechanism configured to increase a fluid resistance with respect to the floating piston where the floating piston comes near the upper or lower end of the hollow chamber to prevent a contact impact between the floating piston and the upper or lower end of the hollow chamber while the floating piston is raised or lowered.

In accordance with an aspect of the present invention, a shock absorber includes a cylinder and a piston valve connected to a piston rod within the cylinder to divide the cylinder into a first chamber and a second chamber. The shock absorber further includes a hollow chamber formed within the piston rod; a floating piston disposed within the hollow chamber to move up and down and to divide the hollow chamber into upper and lower chambers; first and second orifices formed in upper and lower ends of the hollow chamber and connected to the first and second chambers, respectively; and a resistance changing mechanism configured to cooperate with the floating piston and change a fluid resistance with respect to the floating piston where the resistance changing mechanism cooperates therewith.

The resistance changing mechanism may include a bypass passage configured to allow bypass of a fluid flow between the upper chamber and the lower chamber in a partial section of a motion range of the floating piston. Further, the hollow chamber may have an elongated groove formed on an inner wall of the hollow chamber and having a greater length than a thickness of the floating piston, and the bypass passage may be defined between the floating piston and the groove.

The resistance changing mechanism may include a third orifice formed in the inner wall of the hollow chamber to connect the first chamber and the hollow chamber. Here, the third orifice is selectively opened and closed by the floating piston. The first orifice may be formed in the inner wall of the hollow chamber and separated from the third orifice by a distance less than a thickness of the floating piston. A plurality of the third orifices may be formed in the inner wall of the hollow chamber. The first orifice may have a smaller cross-sectional area than the third orifice.

The second orifice may extend from an inlet at a side of the hollow chamber to an outlet at a side of the second chamber, the floating piston may include a taper part formed to be inserted into the inlet of the second orifice and an insertion part formed under the taper part, and the resistance changing mechanism may further include a slant part formed at the inlet of the second orifice to have a decreasing cross-sectional area and having a shape corresponding to the taper part.

BRIEF DESCRIPTION OF THE SEVERAL VIEWS OF THE DRAWINGS

The above and other aspects, features and advantages of the present invention will become apparent from the following description of embodiments given in conjunction with the accompanying drawings, in which.

DETAILED DESCRIPTION

Some embodiments will be described in detail with reference to the accompanying drawings hereinafter.

Figure 1:
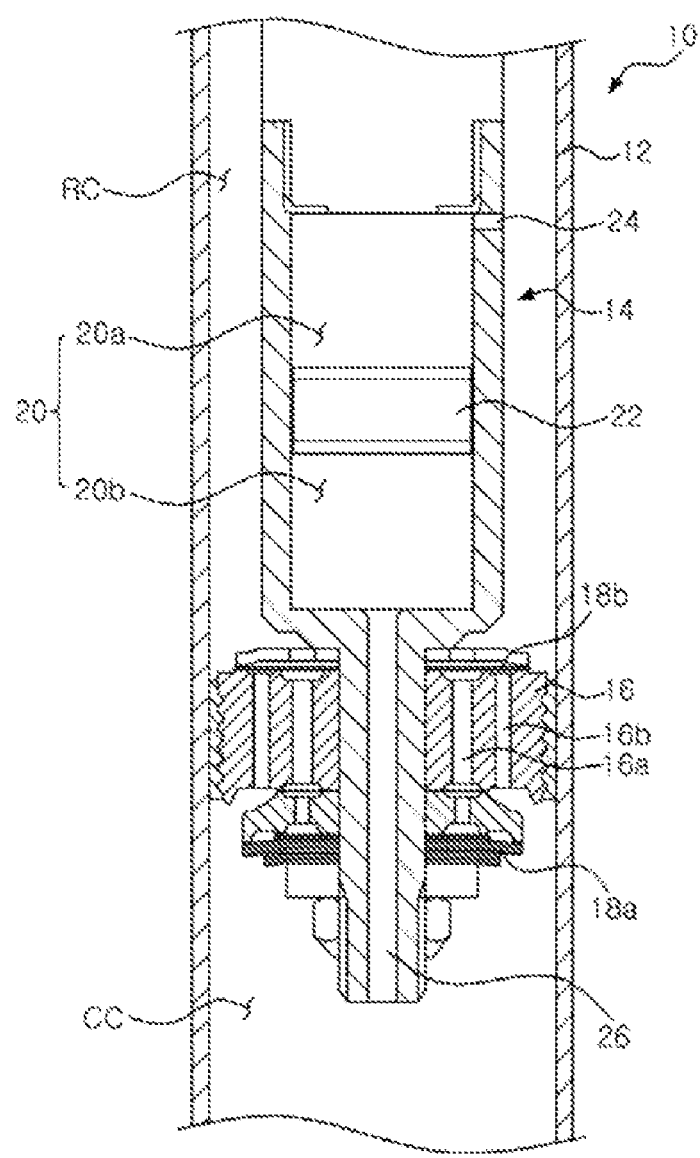
FIG. 1 is a cross-sectional view of a portion of a conventional shock absorber.
Figure 2:
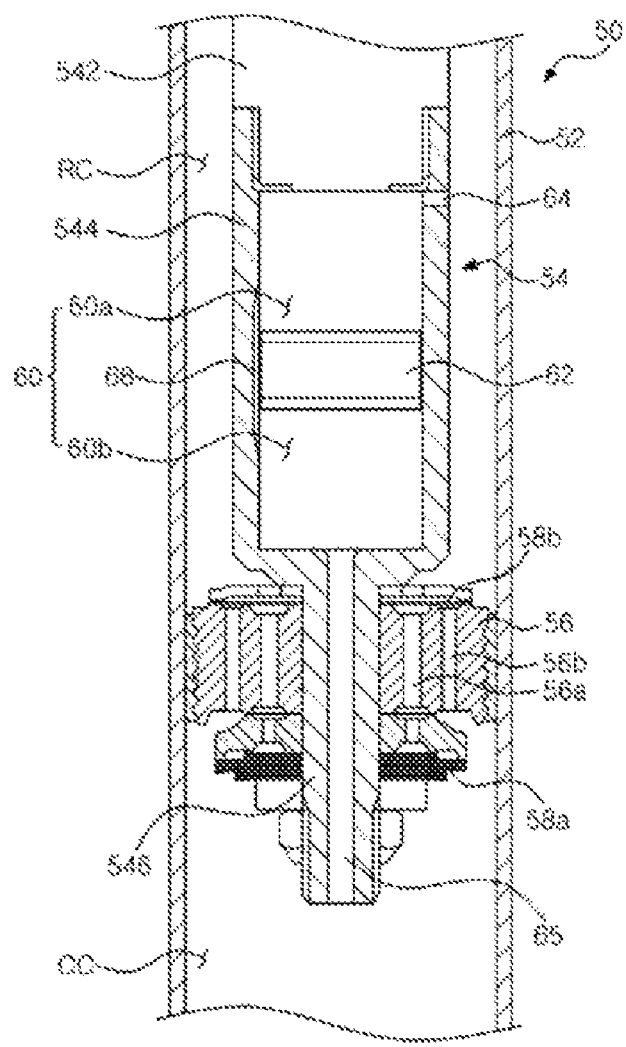
FIG. 2 is a cross-sectional view of a portion of a shock absorber according to one embodiment.

FIG. 2 is an enlarged cross-sectional view of a portion of a shock absorber according to one embodiment of the present invention.

Figure 3:
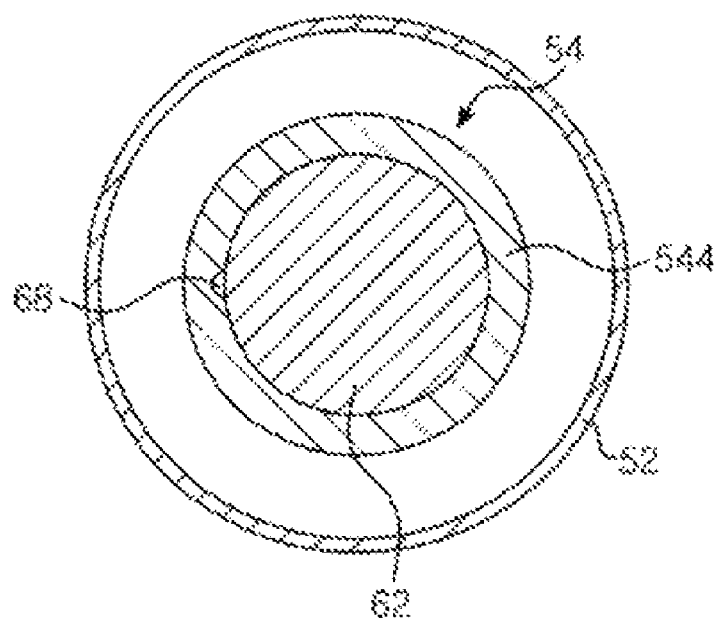
FIG. 3 is a cross-sectional view taken along line A-A of FIG. 2.

Referring to FIGS. 2 and 3, a shock absorber 50 includes a cylinder 52 connected to an axle of the vehicle and a piston rod 54 connected to a vehicle body side. The piston rod 54 is disposed within the cylinder 52 to reciprocate therein and includes a piston valve 56 disposed at one end of the piston rod 54 to divide the cylinder 52 into a compression chamber CC and a tensile chamber RC. The piston valve 56 is formed with tensile orifices 56a and compression orifices 56b through which the tensile chamber RC communicates with the compression chamber CC. Further, a plurality of disc valves 58a and 58b are located on upper and lower surfaces of the piston valve 56 to elastically deform and generate a damping force according to movement of an operating fluid.

The piston rod 54 has a cylindrically elongated hollow chamber 60 therein. The hollow chamber 60 is provided with a floating piston 62 that can move up and down therein. Upper and lower ends of the hollow chamber 60 are formed with first and second orifices 64 and 65 that communicate with the tensile chamber RC and the compression chamber CC, respectively.

Here, the floating piston 62 divides the hollow chamber 60 into upper and lower chambers 60a and 60b, and reduces a damping force while moving up and down by the operating fluid that flows through the first and second orifices 64 and 65.

Additionally, the hollow chamber 60 is provided with a resistance changing mechanism configured to cooperate with the floating piston 62 and to change a fluid resistance with respect to the floating piston 62 where the resistance changing mechanism cooperates therewith. The resistance changing mechanism includes a bypass passage configured to allow bypass of a fluid flow between the upper chamber 60a and the lower chamber 60b in a partial section of a motion range of the floating piston 62. The bypass passage may have any shape as long as the shape allows the bypass of the fluid flow between the upper chamber 60a and the lower chamber 60b. In this embodiment, the hollow chamber 60 has an elongated groove 68 that is formed on an inner wall of the hollow chamber 60 and has a greater length than a thickness of the floating piston 62. The bypass passage is defined between the floating piston 62 and the groove 68.

When the piston rod 54 is slightly displaced within the hollow chamber 60, since the upper and lower chambers 60a and 60b of the hollow chamber 60 communicate with each other through the bypass passage between the groove 68 and the floating piston 62, the operating fluid in one of the tensile chamber RC and the compression chamber CC moves to the other chamber, thereby generating a low damping force.

For this purpose, the piston rod 54 includes a main rod 542 which is shorter than a piston rod of a conventional shock absorber, and a rod extension 544 which is provided to one end of the main rod 542 and has a hollow interior, one end of which is opened to form an opening of the rod extension 544.

The main rod 542 has a stepped end such that the opening of the rod extension 544 is secured to the stepped end of the main rod 542. Further, the other end of the rod extension 544 is formed with a neck 546 which extends longitudinally and is stepped in a small outer diameter to couple the piston valve 56 thereto.

The hollow chamber 60 is formed at the upper end thereof with the first orifice 64, which communicates with the tensile chamber RC and is defined by a through-hole 64 penetrating the piston rod 54 to the upper portion of the hollow chamber 60.

Further, the hollow chamber 60 is formed at the lower end thereof with the second orifice which communicates with the compression chamber CC. Here, the second orifice 65 is defined by a shaft hole 65 which penetrates the neck 546 of the rod extension 544 to the lower portion of the hollow chamber 60 such that the lower portion of the hollow chamber 60 communicates with the compression chamber CC through the shaft hole 66.

On the other hand, the bypass passage of the hollow chamber 60 is defined by a groove 68 formed longitudinally to a predetermined length in the hollow chamber 60. The groove 68 provides a passage which connects the upper chamber 60a and the lower chamber 60b divided by the floating piston 62 such that the operating fluid flows between the upper chamber 60a and the lower chamber 60b through the passage.

Thus, the shock absorber 50 can provide a reduced damping force by the fluid passing through the groove 68. Further, the shock absorber 50 can adjust characteristics of the damping force by adjusting the cross-sectional area or length of the groove 68.

Figure 4:
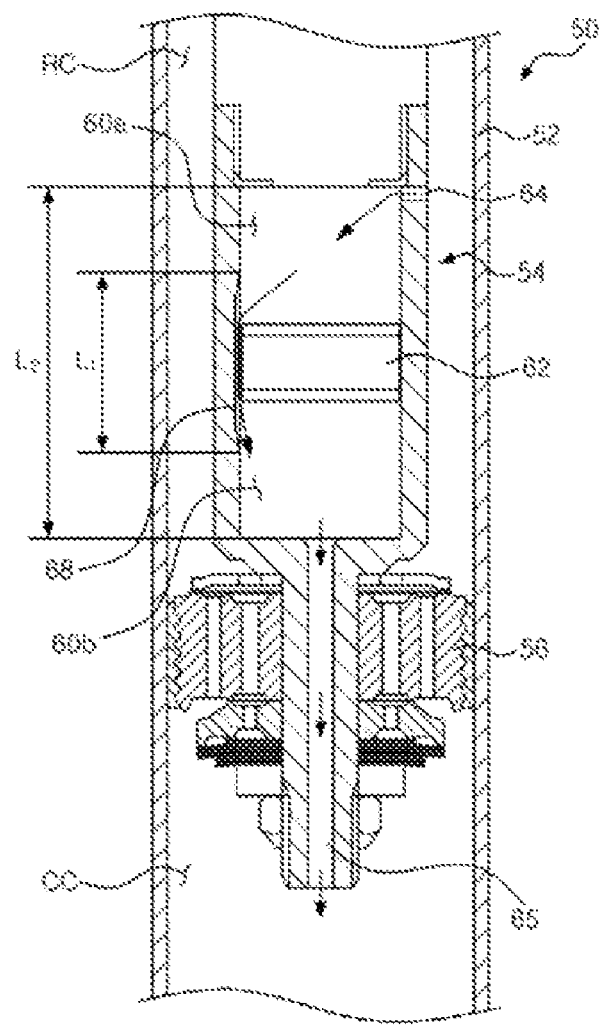
FIG. 4 is a cross-sectional view of the shock absorber of FIG. 2 when generating a very low damping force.

Referring to FIG. 4 showing operation of the shock absorber 50 according to one embodiment to generate a very low damping force, a slight displacement of the piston rod 54 causes the floating piston 62 to move within section L1 where the bypass passage is defined by the groove 68. At this time, the displacement of the piston rod 54 causes an operating fluid in one of the upper chamber 60a and the lower chamber 60b to flow toward the other chamber through the groove 68. As a result, the operating fluid in the tensile chamber RC or the compression chamber CC is supplied into or discharged from the upper chamber 60a or lower chamber 60b.

In a tensile stroke of the piston rod 54 of the shock absorber 50, that is, when the piston rod 54 is raised, the operating fluid in the tensile chamber RC flows into the upper chamber 60a through the through-hole 64, and then moves into the lower chamber 60b through the groove 68. Further, the operating fluid in the lower chamber 60b is discharged into the compression chamber CC through the shaft hole 65.

Conversely, in a compression stroke of the piston rod 54 of the shock absorber 50, that is, when the piston rod 54 is lowered, the operating fluid in the compression chamber CC flows into the lower chamber 60b through the shaft hole 65. Further, the operating fluid in the lower chamber 60b flows into the upper chamber 60a through the groove 68, and the operating fluid in the upper chamber 60a moves into the tensile chamber RC through the through-hole 64.

As such, the shock absorber 50 according to the first embodiment generates a very low damping force while the operating fluid is bypassed from one chamber to the other chamber through the groove 68.

Figure 5:
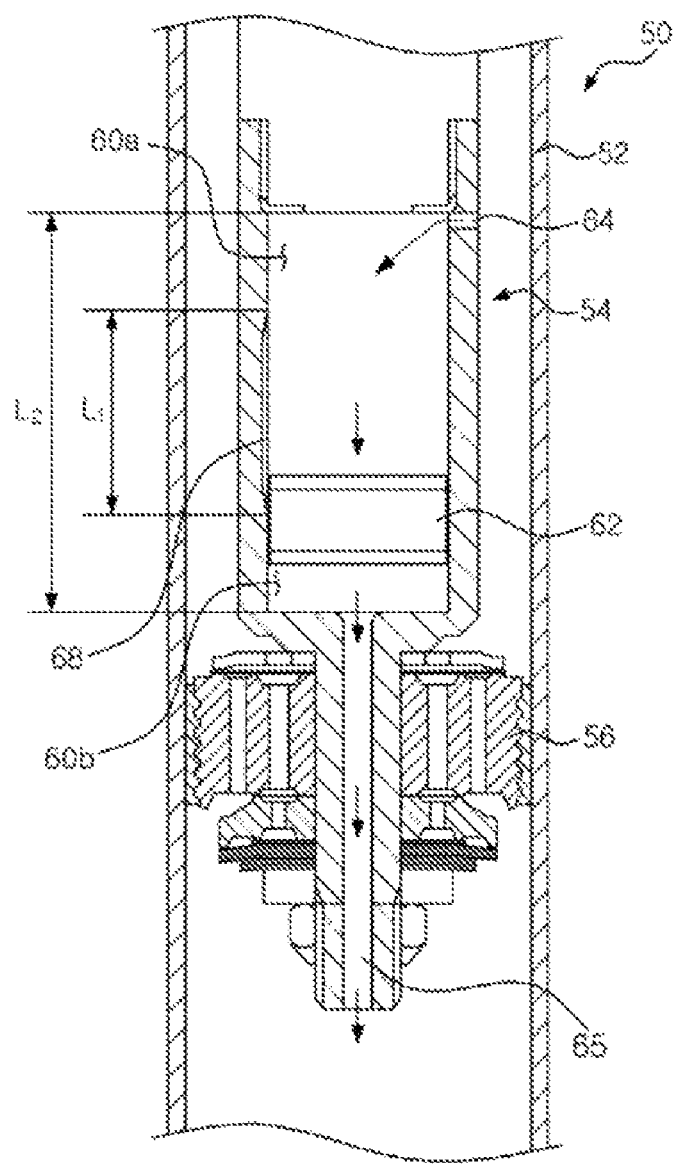
FIG. 5 is a cross-sectional view of the shock absorber of FIG. 2 when generating a low damping force.

Referring to FIG. 5 showing operation of the shock absorber according to the first embodiment to generate a low damping force, a relatively large displacement of the piston rod 54 causes the floating piston 62 to move between an outer region of the section L1 having the bypass passage defined by the groove 68 and the maximum range of motion L2 of the floating piston 62. Here, although the bypass passage defined by the groove 68 is closed by the floating piston 62, the operating fluid in the hollow chamber 60 flows into or from the other chamber through the first orifice 64 or the second orifice 66, so that the low damping force is generated during this operation. At this time, the damping force generated by the shock absorber 50 is higher than the case where the floating piston moves only within the section L1, but is lower than that of a general shock absorber.

Figure 6:
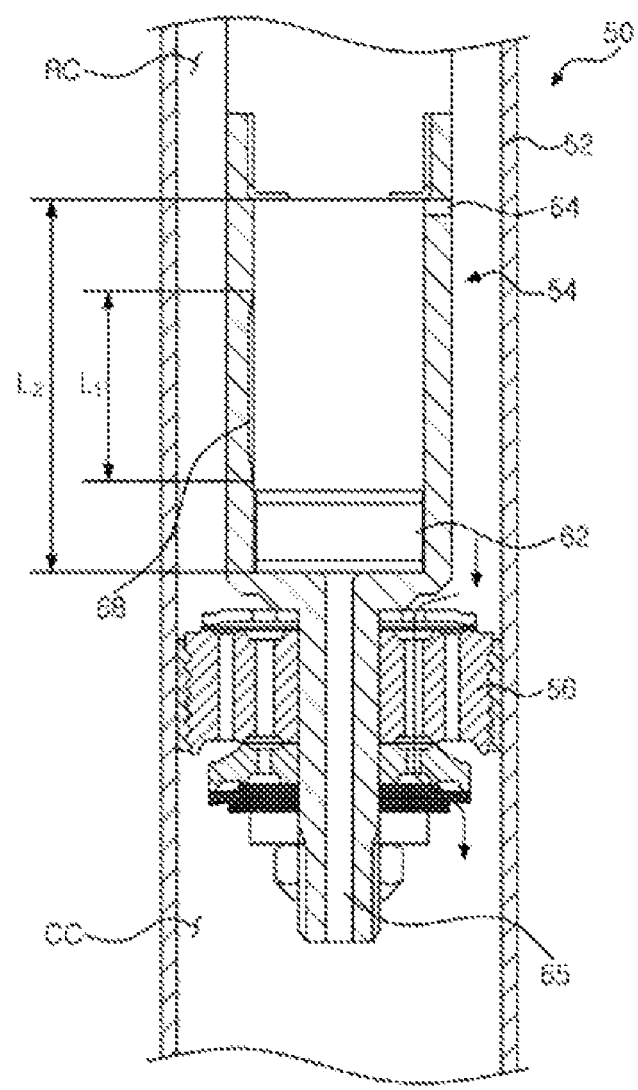
FIG. 6 is a cross-sectional view of the shock absorber of FIG. 2 when generating a high damping force.

Further, referring to FIG. 6 showing operation of the shock absorber according to one embodiment to generate a high damping force, a large displacement of the piston rod 54 causes the floating piston 62 to be located on the upper or lower end of the hollow chamber 60, so that the floating piston 62 does not move up or down. Accordingly, the groove 68 is located above or below the floating piston 62, so that the bypass passage is not formed. Further, the first orifice 64 and the second orifice 65 are closed by the floating piston 62, so that the operating fluid is not moved into or from the hollow chamber 60.

Hence, the shock absorber 50 generates a high damping force by the piston valve 56.

As such, the shock absorber 50, according to the described embodiment, allows the floating piston 62 to be moved according to a displacement degree of the piston valve 56, in which the bypass passage 68 in the hollow chamber 60 is selectively opened by the floating piston 62, thereby generating multi-stage damping force characteristics.

Next, a shock absorber according to another embodiment will be described. In description of this embodiment, the same components as those of the previous embodiment will be denoted by the same reference numerals, and a detailed description thereof will be omitted herein.

Figure 7:
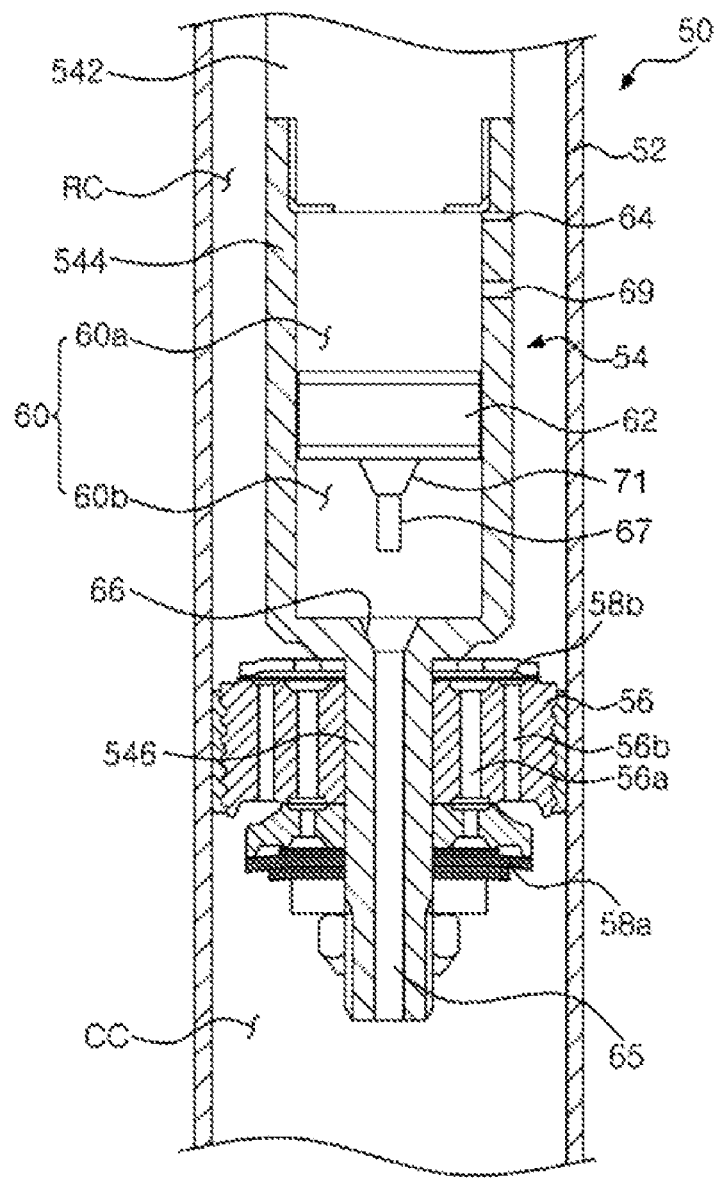
FIG. 7 is a cross-sectional view of a portion of a shock absorber according to another embodiment.

FIG. 7 is an enlarged cross-sectional view of a portion of a shock absorber according to another embodiment.

Referring to FIG. 7, a floating piston 62 of the shock absorber according to this embodiment has an outer peripheral surface that contacts the inner surface of the hollow chamber while moving within the hollow chamber 60, and divides the hollow chamber 50 into an upper chamber 60a and a lower chamber 60b. The outer circumferential surface of the floating piston 62 may be finished with a material, such as Teflon resin, capable of reducing friction between the ring and the hollow chamber.

As in the aforementioned embodiment, the hollow chamber 60 is formed at upper and lower ends thereof with first and second orifices 64 and 65 that communicate with the tensile chamber RC and the compression chamber CC, respectively. Here, the operating fluid flowing between the hollow chamber 60 and the tensile chamber RC or between the hollow chamber 60 and the compression chamber CC through the first or second orifice 64 or 65 causes the floating piston to be moved up and down in the hollow chamber 60. As such, the shock absorber 50 allows the damping force to be reduced while the fluid flows into or from the hollow chamber 60 without passing through the piston valve 56.

Additionally, the shock absorber 50 includes passage reduction type resistance changing mechanisms disposed at upper and lower parts thereof to control a flow of the fluid flowing through the first and second orifice 64 and 65 while changing the fluid resistance with respect to the floating piston. The resistance changing mechanism controls the flow of the fluid flowing through the first or second orifice 64 or 65 to prevent generation of noise due to collision between the floating piston 62 and the upper or lower end of the hollow chamber 60 when the floating piston 62 is raised or lowered.

As in the aforementioned embodiment, the first orifice 64 is defined by a through hole which connects the upper portion of the hollow chamber 60 and the tensile chamber. Further, the second orifice 65 is defined by an elongated shaft hole which penetrates the neck 546 of the rod extension 544 to the lower portion of the hollow chamber 60 such that the lower portion of the hollow chamber 60 communicates with the compression chamber CC through the shaft hole. The shaft hole extends from an inlet at a side of the hollow chamber 60 to an outlet at a side of the compression chamber CC.

Further, as the resistance changing mechanism, the shock absorber includes a third orifice 69 separated downward a predetermined distance from the first orifice 64. Here, the distance between the third orifice 69 and the first orifice 64 is less than the thickness of the floating piston 62. The third orifice 69 may be defined by an assistant through-hole 69 through which the hollow chamber 60 communicates with the tensile chamber.

Figure 8:
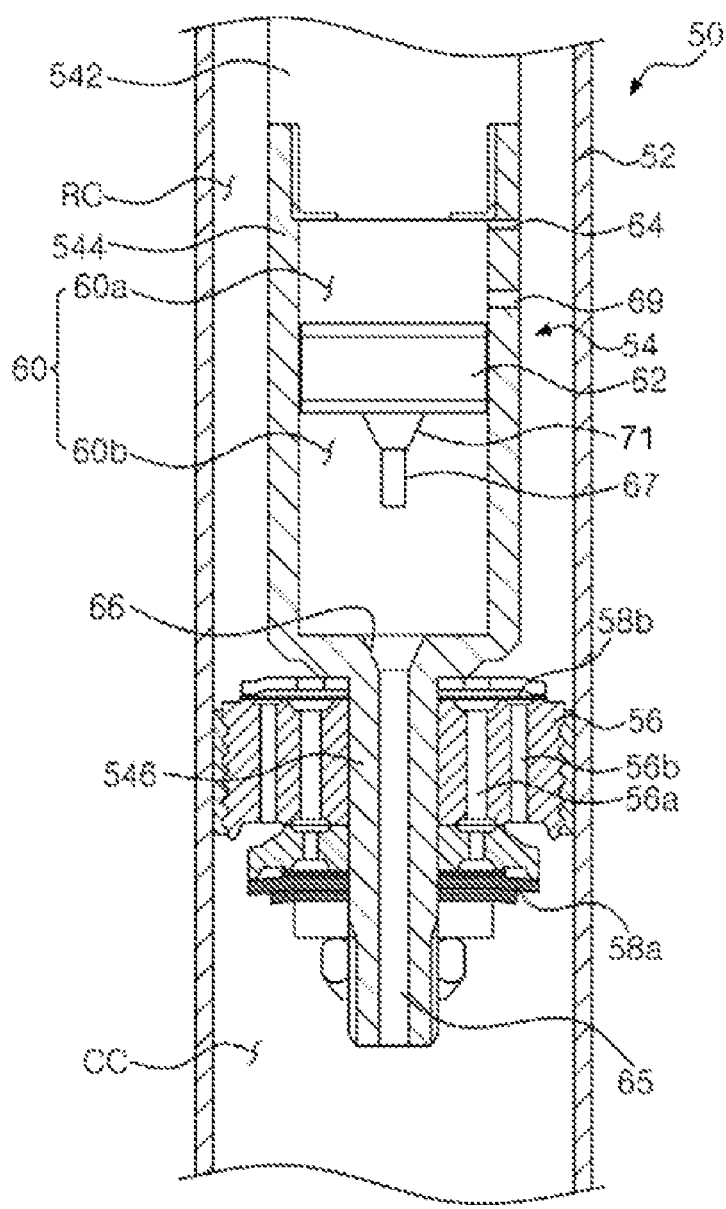
FIG. 8 is a cross-sectional view of a floating piston of the shock absorber of FIG. 7 at an initial raising stage.
Figure 9:
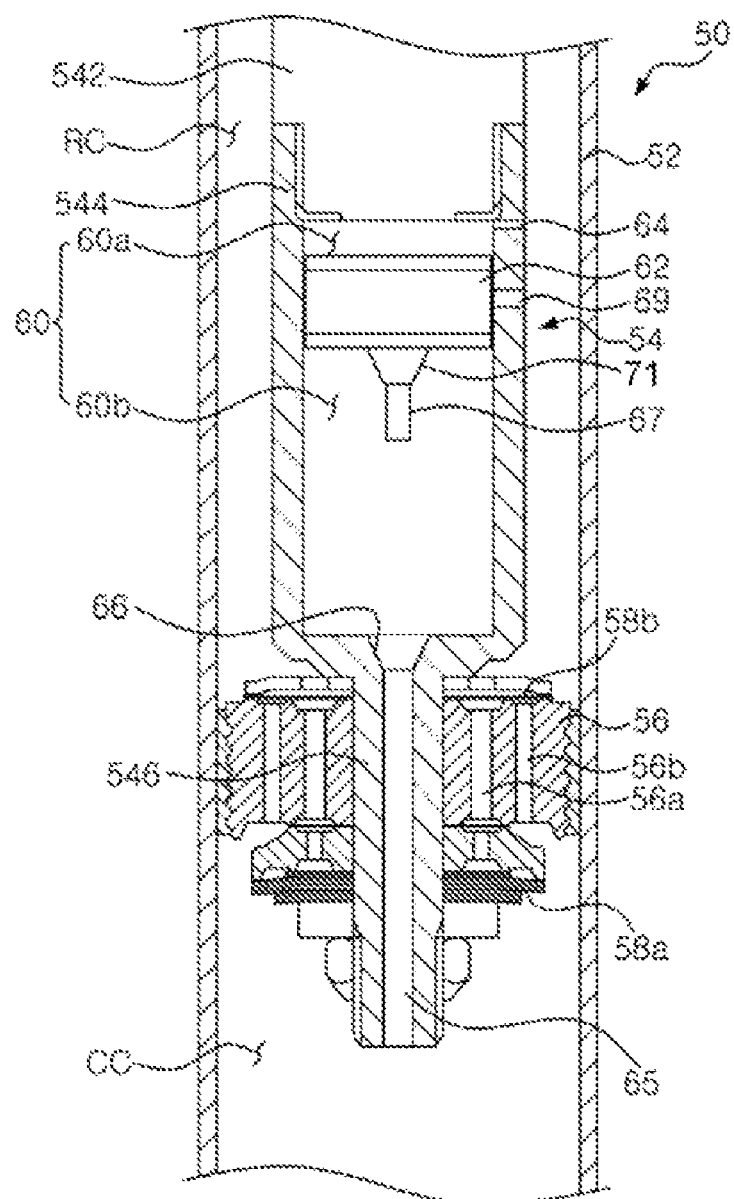
FIG. 9 is a cross-sectional view of the floating piston of the shock absorber of FIG. 7 at a middle raising stage.

FIGS. 8 and 9 are cross-sectional views of a floating piston 62 of the shock absorber 50 according to the one embodiment at initial and middle raising stages.

Referring to FIG. 8, the third orifice 69 allows the fluid in the hollow chamber 60 to be discharged into the tensile chamber RC at the initial raising stage of the floating piston 62. On the other hand, as the floating piston 62 continues to be raised, the third orifice 69 is gradually closed by the outer surface of the floating piston 62, as shown in FIG. 9. As the third orifice 69 is closed by the floating piston 62, the resistance of the fluid flowing through the first orifice 64 increases, so that the rising speed of the floating piston 62 is lowered. In this manner, as the rising speed of the floating piston 62 is decreased, contact noise between the floating piston 62 and the upper end of the hollow chamber 60 is reduced.

Additionally, the first orifice 64 may have a smaller cross-sectional area than the third orifice 69. As a result, when the floating piston 62 is raised, the fluid in the hollow chamber 60 can be rapidly discharged through the first and third orifices 64 and 69, and when the third orifice 69 is closed, the discharged amount of the fluid is rapidly decreased, thereby generating the damping force by the fluid resistance.

On the other hand, the shock absorber according to this embodiment includes a slant part 66, which is formed at the inlet of the second orifice 65 and is slanted to have a decreasing cross-sectional area to the inlet of the second orifice 65.

Further, the floating piston 62 is formed at the lower portion thereof with an insertion part 67 corresponding to the second orifice 65. When the floating piston 62 is lowered, the insertion part 67 is inserted into the second orifice 65 and closes the second orifice 65.

On the insertion part 67, a taper part 71 is formed in a shape corresponding to the slant part 66.

Figure 10:
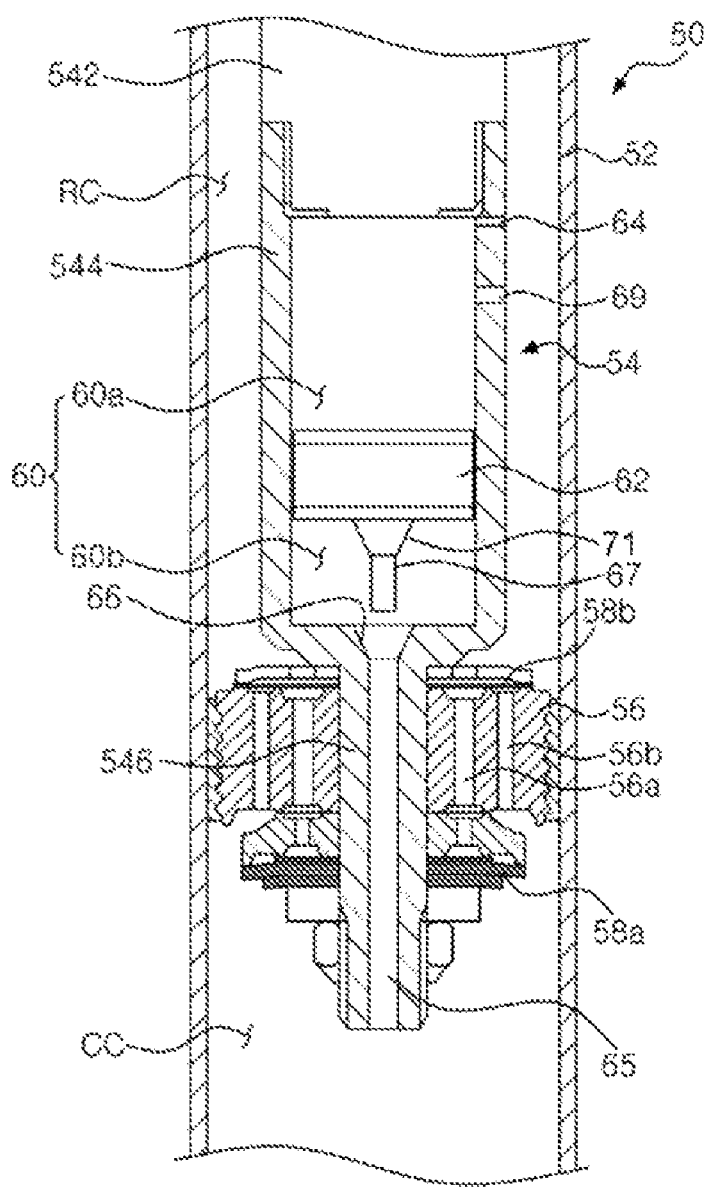
FIG. 10 is a cross-sectional view of the floating piston of the shock absorber of FIG. 7 at an initial lowering stage.
Figure 11:
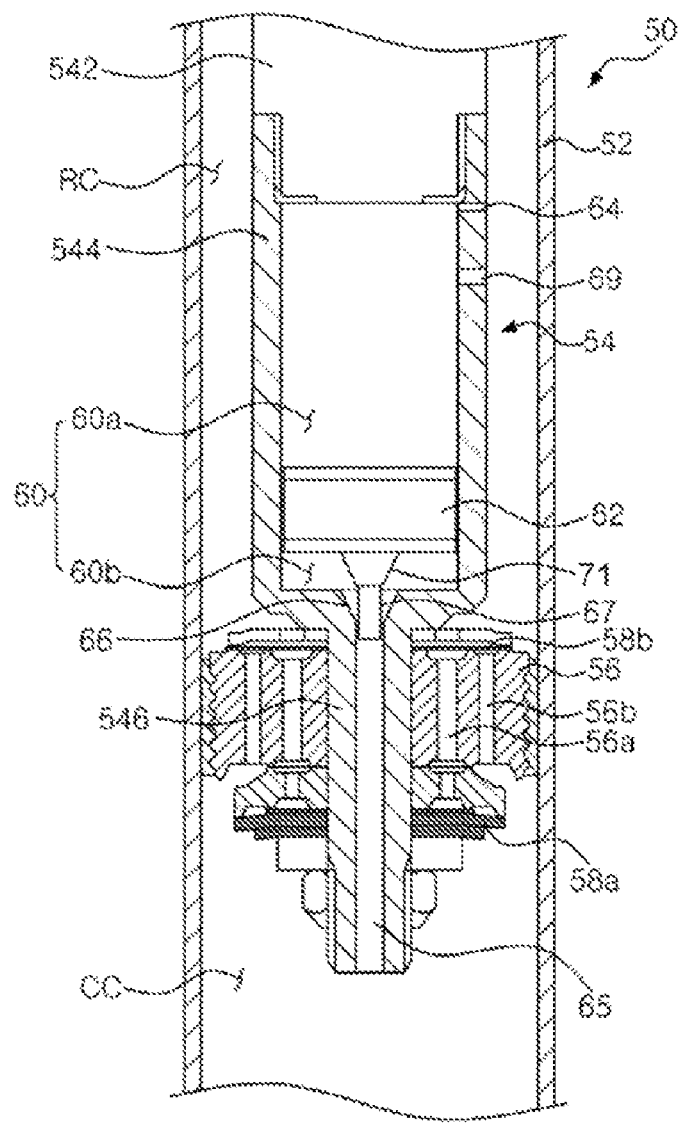
FIG. 11 is a cross-sectional view of the floating piston of the shock absorber of FIG. 7 at a middle lowering stage.

FIGS. 10 and 11 are cross-sectional views of the floating piston 62 of the shock absorber 50 according to one embodiment at initial and middle lowering stages.

Referring to FIG. 10, at the initial lowering stage of the floating piston 62, the fluid in the lower chamber 60b is discharged into the compression chamber CC through the second orifice 65.

Then, as the floating piston 62 continues to be lowered, the insertion part 67 is inserted into the slant part 66 of the second orifice 65, as shown in FIG. 11. At this time, the second orifice 65 is partially closed by the insertion part 67, thereby generating the fluid resistance. As a result, the lowering speed of the piston 62 is decreased, and the contact noise between the floating piston 62 and the lower end of the hollow chamber 60 is reduced.

Figure 12:
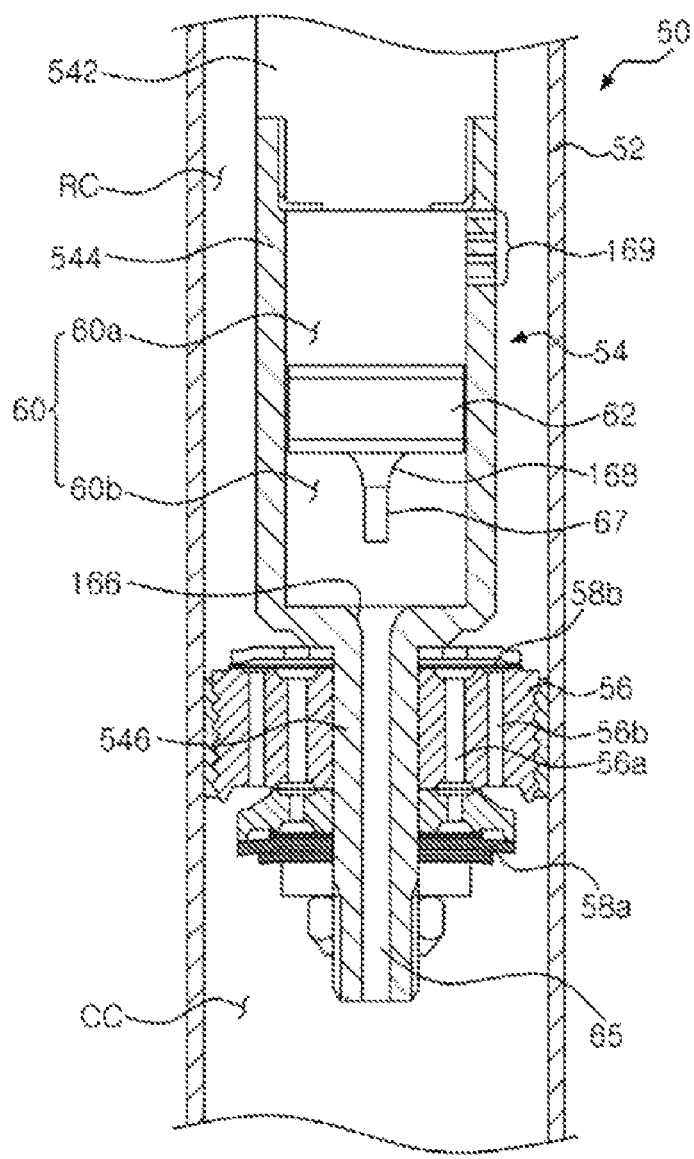
FIG. 12 is an enlarged cross-sectional view of a portion of a shock absorber according to yet another embodiment of the present invention.

FIG. 12 is an enlarged cross-sectional view of a portion of a shock absorber 50 according to another embodiment. According to this embodiment, the shock absorber 50 includes a plurality of third orifices 169 defined in the inner wall of the hollow chamber by a plurality of through-holes. The plurality of third orifices 169 are formed at constant intervals in the longitudinal direction of the piston rod 54.

Hence, as the floating piston 62 is raised, the third orifices 169 from the lowermost third orifice to the uppermost third orifice provided as the resistance changing mechanism at the upper side of the hollow chamber are sequentially closed by the floating piston, so that a total opening area of the orifices is reduced. As a result, the rising speed of the floating piston 62 can be gradually decreased.

Additionally, the rising speed of the floating piston 62 can be adjusted by adjusting the size of the third orifices 169 and the separation therebetween.

Furthermore, as the resistance changing mechanism formed at the lower side of the hollow chamber, the slant part 166 may be formed in a convex or concave shape and the insertion part 67 may also be formed in a concave or convex shape so as to correspond to the shape of the slant part 166. Accordingly, when the insertion part 67 is inserted into the concave or convex-shape slant part 166, the area of the fluid passage is varied and the lowering speed of the floating piston 62 can be gradually decreased.

As such, the lowering speed of the floating piston 62 can be adjusted by changing the shape of the slant part 166 to have the convex or concave shape.

Further, in order to adjust the lowering speed of the floating piston 62, the insertion part 67 may be formed to have a cross-sectional area which gradually decreases downward.

As apparent from the above description, a shock absorber according to embodiments of the present disclosure can change a fluid resistance with respect to a floating piston at any location within a hollow chamber of a piston rod in which the floating piston is moved, thereby facilitating control of motional characteristics of the floating piston and a damping force and/or shock absorption of the shock absorber thereby. According to one embodiment of the invention, the shock absorber allows an operating fluid in the hollow chamber to flow into the other chamber through a bypass fluid by a slight displacement of the piston rod to generate a very low damping force, thereby improving driving comfort of the vehicle. Further, the shock absorber according to the invention can generate a suitable damping force according to a driving state of the vehicle by gradually changing the damping force depending on a displacement degree of the piston rod to improve driving comfort, and can also generate a high damping force when the vehicle is driven uphill or through a corner, thereby maintaining driving stability of the vehicle. According to another embodiment of the invention, the shock absorber can increase the fluid resistance when raising or lowering the floating piston to the upper and lower end of the hollow chamber, thereby preventing noise due to collision between the floating piston and the upper or lower end of the hollow chamber.

Although the present invention has been described with reference to the embodiments and the accompanying drawings, it should be noted that the present invention is not limited to the aforementioned embodiments, and that various modifications and equivalent embodiments can be made without departing from the spirit and scope of the present invention, as defined only by the accompanying claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A shock absorber comprising:
a cylinder;
a piston valve connected to a piston rod within the cylinder to divide the cylinder into a first chamber and a second chamber;
a hollow chamber formed within the piston rod;
a floating piston disposed within the hollow chamber to move up and down and to divide the hollow chamber into upper and lower chambers;
first and second orifices formed in upper and lower ends of the hollow chamber and in fluid communication with the first and second chambers, respectively; and
a resistance changing mechanism configured to cooperate with the floating piston and change a fluid resistance with respect to the floating piston,
wherein the second orifice extends from an inlet at a side of the hollow chamber to an outlet at a side of the second chamber, the floating piston comprises a taper part formed to be inserted into the inlet of the second orifice and an insertion part formed under the taper part, and the resistance changing mechanism comprises a slant part formed at the inlet of the second orifice to have a decreasing cross-sectional area and having a shape corresponding to the taper part.

2. The shock absorber according to claim 1 wherein the resistance changing mechanism comprises a bypass passage configured to allow bypass of a fluid flow between the upper chamber and the lower chamber in a partial section of a range of motion of the floating piston.

3. The shock absorber according to claim 2 wherein the hollow chamber has an elongated groove formed on an inner wall of the hollow chamber, the groove having a greater length than a thickness of the floating piston, and the bypass passage is defined between the floating piston and the groove.

4. The shock absorber according to claim 1 wherein the resistance changing mechanism comprises a third orifice formed in the inner wall of the hollow chamber and in fluid communication with the first chamber and the hollow chamber, the third orifice being selectively opened and closed by the floating piston.

5. The shock absorber according to claim 4 wherein the first orifice is formed in the inner wall of the hollow chamber and is separated from the third orifice by a distance less than a thickness of the floating piston.

6. The shock absorber according to claim 4 wherein a plurality of the third orifices are formed in the inner wall of the hollow chamber.

7. The shock absorber according to claim 4 wherein the first orifice has a smaller cross-sectional area than the third orifice.

* * * * *